US012679927B2

(12) United States Patent
Lee

(10) Patent No.: US 12,679,927 B2
(45) Date of Patent: Jul. 14, 2026

(54) LAMINATE, MULTILAYER BOARD, AND MANUFACTURING METHOD OF LAMINATE

(71) Applicant: AZOTEK CO., LTD., Taoyuan City (TW)

(72) Inventor: Hung-Jung Lee, Taoyuan City (TW)

(73) Assignee: AZOTEK CO., LTD., Taoyuan City (TW)

( * ) Notice: Subject to any disclaimer, the term of this patent is extended or adjusted under 35 U.S.C. 154(b) by 245 days.

(21) Appl. No.: 18/403,732

(22) Filed: Jan. 4, 2024

(65) Prior Publication Data

US 2024/0368339 A1 Nov. 7, 2024

Related U.S. Application Data

(60) Provisional application No. 63/500,276, filed on May 5, 2023.

(30) Foreign Application Priority Data

Aug. 10, 2023 (TW) ................................ 112130160

(51) Int. Cl.
*C08G 63/19* (2006.01)
*B32B 15/09* (2006.01)
(Continued)

(52) U.S. Cl.
CPC .............. *C08G 63/19* (2013.01); *B32B 15/09* (2013.01); *B32B 27/36* (2013.01); *C08G 63/181* (2013.01); *C08G 69/26* (2013.01); *C08G 2250/00* (2013.01)

(58) Field of Classification Search
None
See application file for complete search history.

(56) References Cited

U.S. PATENT DOCUMENTS 4,737,398 A * 4/1988 Ikenaga ................ B32B 37/153 428/331
5,719,354 A 2/1998 Jester et al.
(Continued)

FOREIGN PATENT DOCUMENTS

CN 101831306 A 9/2010
JP 2000-286537 A 10/2000
(Continued)

OTHER PUBLICATIONS

Sunamoto—WO 2016-174868 A1—MT—LCP w—amounts + hi Tm—2016 (Year: 2016).*
(Continued)

*Primary Examiner* — John Vincent Lawler
(74) *Attorney, Agent, or Firm* — CKC & Partners Co., LLC

(57) ABSTRACT

A laminate includes a liquid crystal polymer film and at least one metallic layer attached to a surface of the liquid crystal polymer film. The liquid crystal polymer film has a melting point greater than or equal to 345° C. The liquid crystal polymer film includes a liquid crystal polymer that is polymerized from reactants. The reactants include first monomers, second monomers, third monomers, fourth monomers, or combinations thereof. These first monomers are aromatic dicarboxylic acids, aliphatic dicarboxylic acids, or combinations thereof, these second monomers are aromatic hydroxycarboxylic acids, these third monomers are aromatic diols, aliphatic diols, or combinations thereof, and these fourth monomers are aromatic diamines, aromatic hydroxylamines, aromatic aminocarboxylic acids, or combinations thereof.

14 Claims, 5 Drawing Sheets

ML1

(51) Int. Cl.
*B32B 27/36* (2006.01)
*C08G 63/181* (2006.01)
*C08G 69/26* (2006.01)

(56) References Cited

U.S. PATENT DOCUMENTS

| | | | | |
|---|---|---|---|---|
| 2013/0085253 | A1* | 4/2013 | Gray | C08G 63/605 528/206 |
| 2015/0195921 | A1* | 7/2015 | Onodera | H05K 3/4691 174/258 |
| 2021/0070927 | A1* | 3/2021 | Zhang | B32B 15/08 |
| 2022/0250371 | A1* | 8/2022 | Ogawa | B32B 15/18 |
| 2023/0105357 | A1* | 4/2023 | Sasaki | C08G 63/02 174/258 |
| 2023/0309219 | A1 | 9/2023 | Lee | |

FOREIGN PATENT DOCUMENTS

| | | | | | |
|---|---|---|---|---|---|
| JP | 2015-174913 | A | | 10/2015 | |
| JP | WO2014046014 | A1 | | 8/2016 | |
| JP | 2021-31574 | A | | 3/2021 | |
| JP | 2022-70936 | A | | 5/2022 | |
| JP | 2022-70938 | A | | 5/2022 | |
| JP | 7521702 | B2 | | 7/2024 | |
| JP | 7572535 | B2 | | 10/2024 | |
| TW | 201643043 | A | | 12/2016 | |
| TW | 202104393 | A | | 2/2021 | |
| TW | 202126480 | A | | 7/2021 | |
| TW | 202146583 | A | | 12/2021 | |
| TW | 202247993 | A | | 12/2022 | |
| TW | 202313808 | A | | 4/2023 | |
| WO | WO-2016174868 | A1 | * | 11/2016 | H05K 1/03 |
| WO | 2017175649 | A1 | | 10/2017 | |
| WO | WO-2019240013 | A1 | * | 12/2019 | C08L 77/12 |

OTHER PUBLICATIONS

Umemoto—WO 2019-240013 A1—MT—hi Tm LCP w—compositions—circuit—2019 (Year: 2019).*
Fukada—Crystallization kinetics and annealing behavior of LCP—Thesis—1991 (Year: 1991).*
Hong & Economy—Annealing films of LCP films—Macromolecules—1995 (Year: 1995).*
Hung-Jung Lee, U.S. Appl. No. 18/335,155, titled with “Method for Manufacturing Liquid Crystal Polymer Film” filed on Jun. 15, 2023.

* cited by examiner

LAMINATE, MULTILAYER BOARD, AND MANUFACTURING METHOD OF LAMINATE

CROSS-REFERENCE TO RELATED APPLICATION

This application claims priority to U.S. Provisional Application Ser. No. 63/500,276 filed May 5, 2023, and Taiwan Application Serial Number 112130160, filed Aug. 10, 2023, the disclosures of which are incorporated herein by reference in their entireties.

BACKGROUND

Field of Invention

The present disclosure relates to a laminate, a multilayer board, and a method of manufacturing the laminate.

Description of Related Art

A laminate usually includes an insulating substrate and metal wires. When stacking several laminates and then performing hot pressing and laminating, if the heat resistance of the insulating substrates is poor, the metal wires may easily sink into the insulating substrates or be deformed. Therefore, impedance errors in pre-circuit design may occur, thereby increasing signal transmission loss and cross-talk between wires. In view of this, there is an urgent need to develop solutions that can overcome the above problems.

SUMMARY

The present disclosure provides a laminate including a liquid crystal polymer film and at least one metallic layer attached to a surface of the liquid crystal polymer film. The liquid crystal polymer film has a melting point greater than or equal to 345° C. The liquid crystal polymer film includes a liquid crystal polymer polymerized from reactants including a plurality of first monomers, a plurality of second monomers, a plurality of third monomers, a plurality of fourth monomers, or combinations thereof. The first monomers are aromatic dicarboxylic acids, aliphatic dicarboxylic acids, or combinations thereof. The second monomers are aromatic hydroxycarboxylic acids. The third monomers are aromatic diols, aliphatic diols, or combinations thereof. The fourth monomers are aromatic diamines, aromatic hydroxylamines, aromatic aminocarboxylic acids, or combinations thereof.

In some embodiments, the liquid crystal polymer is polymerized from the aromatic diols, the aromatic dicarboxylic acids, and the aromatic hydroxycarboxylic acids.

In some embodiments, the liquid crystal polymer is polymerized from the aromatic dicarboxylic acids, the aromatic hydroxycarboxylic acids, and the aromatic hydroxylamines.

In some embodiments, the liquid crystal polymer is polymerized from the aromatic dicarboxylic acids, the aromatic hydroxycarboxylic acids, and the aliphatic diols.

In some embodiments, the liquid crystal polymer includes a plurality of first monomer units, a plurality of second monomer units, a plurality of third monomer units, and a plurality of fourth monomer units. Each of the first monomer units is

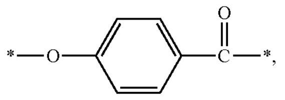

each of the second monomer units is

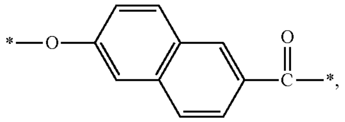

each of the third monomer units is

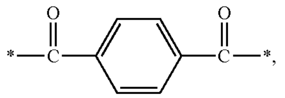

and each of the fourth monomer units is

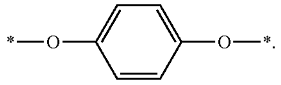

In some embodiments, in the liquid crystal polymer, the first monomer units are 60 mole % to 74 mole %, the second monomer units are 14 mole % to 16 mole %, the third monomer units are 5 mole % to 13 mole %, and the fourth monomer units are 5 mole % to 13 mole %.

In some embodiments, in the liquid crystal polymer, the first monomer units are 60 mole % to 74 mole %, the second monomer units are 16 mole % to 18 mole %, the third monomer units are 9 mole % to 12 mole %, and the fourth monomer units are 9 mole % to 12 mole %.

In some embodiments, the liquid crystal polymer includes a plurality of first monomer units and a plurality of second monomer units. Each of the first monomer units is

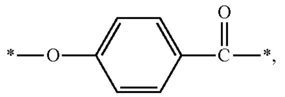

and each of the second monomer units is

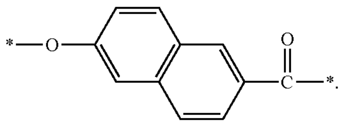

The first monomer units are 70 mole % to 85 mole %, and the second monomer units are 15 mole % to 30 mole %.

In some embodiments, the liquid crystal polymer includes a plurality of first monomer units, a plurality of second monomer units, and a plurality of third monomer units. Each of the first monomer units is

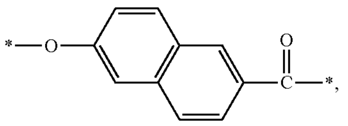

each of the second monomer units is

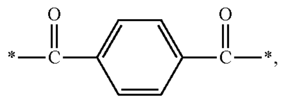

and each of the third monomer units is

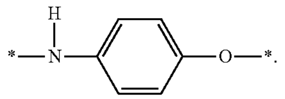

The first monomer units are 55 mole % to 65 mole %, the second monomer units are 15 mole % to 25 mole %, and the third monomer units are 15 mole % to 25 mole %.

The present disclosure provides a multilayer board including at least one single-sided board or at least one double-sided board and the laminate in any one of the above embodiments. The laminate is laminated on the at least one single-sided board or the at least one double-sided board.

The present disclosure provides a method of manufacturing a laminate. The method includes the following operations. A liquid crystal polymer film is produced from a liquid crystal polymer having a melting point greater than or equal to 345° C. The liquid crystal polymer is polymerized from reactants including a plurality of first monomers, a plurality of second monomers, a plurality of third monomers, a plurality of fourth monomers, or combinations thereof. The first monomers are aromatic dicarboxylic acids, aliphatic dicarboxylic acids, or combinations thereof, the second monomers are aromatic hydroxycarboxylic acids, the third monomers are aromatic diols, aliphatic diols, or combinations thereof, and the fourth monomers are aromatic diamines, aromatic hydroxylamines, aromatic aminocarboxylic acids, or combinations thereof. At least one metallic layer is formed to attach to a surface of the liquid crystal polymer film.

In some embodiments, the liquid crystal polymer is polymerized by the aromatic diols, the aromatic dicarboxylic acids, and the aromatic hydroxycarboxylic acids.

In some embodiments, the liquid crystal polymer includes a plurality of first monomer units, a plurality of second monomer units, a plurality of third monomer units, and a plurality of fourth monomer units. Each of the first monomer units is

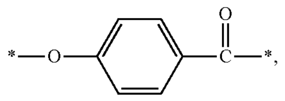

each of the second monomer units is

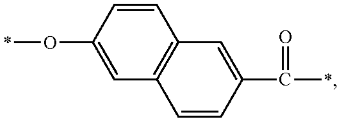

each of the third monomer units is

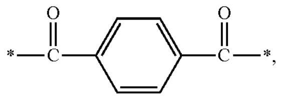

and each of the fourth monomer units is

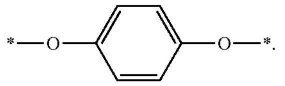

In some embodiments, in the liquid crystal polymer, the first monomer units are 60 mole % to 74 mole %, the second monomer units are 14 mole % to 16 mole %, the third monomer units are 5 mole % to 13 mole %, and the fourth monomer units are 5 mole % to 13 mole %.

In some embodiments, in the liquid crystal polymer, the first monomer units are 60 mole % to 74 mole %, the second monomer units are 16 mole % to 18 mole %, the third monomer units are 9 mole % to 12 mole %, and the fourth monomer units are 9 mole % to 12 mole %.

The present disclosure provides a method of manufacturing a laminate. The method includes the following operations. A first liquid crystal polymer film is produced from a liquid crystal polymer having a melting point less than 345° C. The liquid crystal polymer is formed by polymerized by reactants including a plurality of first monomers, a plurality of second monomers, a plurality of third monomers, a plurality of fourth monomers, or combinations thereof. The first monomers are aromatic dicarboxylic acids, aliphatic dicarboxylic acids, or combinations thereof, the second monomers are aromatic hydroxycarboxylic acids, the third monomers are aromatic diols, aliphatic diols, or combinations thereof, and the fourth monomers are aromatic diamines, aromatic hydroxylamines, aromatic aminocarboxylic acids, or combinations thereof. A first melting point of the first liquid crystal polymer film is $T_m$, and $T_m$ is less than 345° C. The first liquid crystal polymer film is heated with a heating process to form a second liquid crystal polymer film, and the second liquid crystal polymer film has a second melting point greater than or equal to 345° C. A heating temperature of the heating process is $T_m$−40° C. to $T_m$. At least one metallic layer is formed to attach to a surface of the second liquid crystal polymer film.

In some embodiments, the liquid crystal polymer is polymerized by the aromatic dicarboxylic acids, the aromatic hydroxycarboxylic acids, and the aromatic hydroxylamines.

In some embodiments, the liquid crystal polymer is polymerized by the aromatic dicarboxylic acids, the aromatic hydroxycarboxylic acids, and the aliphatic diols.

In some embodiments, the liquid crystal polymer includes a plurality of first monomer units and a plurality of second monomer units. Each of the first monomer units is

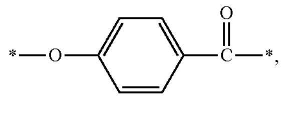

and each of the second monomer units is

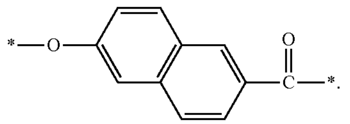

The first monomer units are 70 mole % to 85 mole %, and the second monomer units are 15 mole % to 30 mole %.

In some embodiments, the liquid crystal polymer includes a plurality of first monomer units, a plurality of second monomer units, and a plurality of third monomer units. Each of the first monomer units is

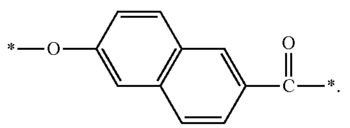

each of the second monomer units is

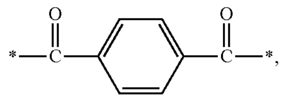

and each of the third monomer units is

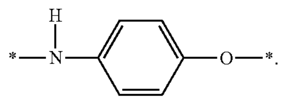

The first monomer units are 55 mole % to 65 mole %, the second monomer units are 15 mole % to 25 mole %, and the third monomer units are 15 mole % to 25 mole %.

BRIEF DESCRIPTION OF THE DRAWINGS

The present disclosure can be more fully understood by reading the detailed description of the following embodiments and referring to the accompanying drawings.

DETAILED DESCRIPTION

Figure 1:
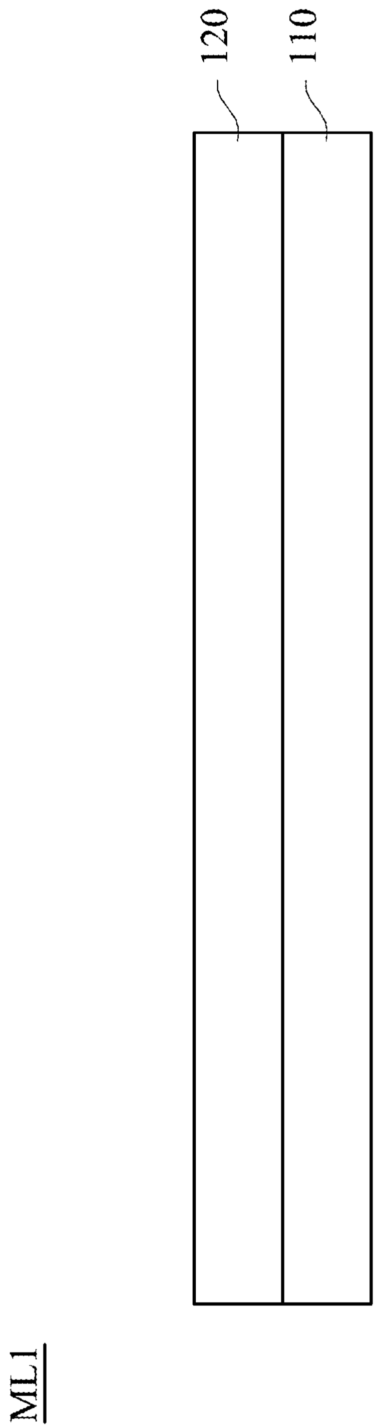
FIG. 1 to FIG. 4 are schematic cross-sectional views of a multilayer board according to various embodiments of the present disclosure.

The following embodiments are disclosed with accompanying diagrams for detailed description. For illustration clarity, many details of practice are explained in the following descriptions. However, it should be understood that these details of practice do not intend to limit the present disclosure. That is, these details of practice are not necessary in parts of embodiments of the present disclosure. Furthermore, for simplifying the drawings, some of the conventional structures and elements are shown with schematic illustrations.

Although below using a series of operations or steps described in this method disclosed, the order of these operations or steps shown should not be construed to limit the present disclosure. For example, certain operations or steps may be performed in different orders and/or concurrently with other steps. Moreover, not all steps must be performed in order to achieve the depicted embodiment of the present disclosure. Furthermore, each operation or procedure described herein may contain several sub-steps or actions.

The present disclosure provides a laminate including a liquid crystal polymer film and at least one metallic layer attached to the surface of the liquid crystal polymer film. The liquid crystal polymer film has a melting point greater than or equal to 345° C. In some embodiments, the melting point is 345° C. to 400° C., such as 345, 350, 355, 360, 365, 370, 375, 385, 390, 395, or 400° C. The liquid crystal polymer film includes a liquid crystal polymer polymerized from reactants. The reactants include a plurality of first monomers, a plurality of second monomers, a plurality of third monomers, a plurality of fourth monomers, or combinations thereof. The first monomers are aromatic dicarboxylic acids, aliphatic dicarboxylic acids, or combinations thereof, the second monomers are aromatic hydroxycarboxylic acids, the third monomers are aromatic diols, aliphatic diols, or combinations thereof, and the fourth monomers are aromatic diamines, aromatic hydroxylamines, aromatic aminocarboxylic acids, or combinations thereof. The laminate can withstand thermal shock tests from 250° C. to 320° C. due to the good heat resistance of liquid crystal polymer film. Specifically, the metallic layer does not sink into the liquid crystal polymer film during the thermal shock tests or be deformed.

The present disclosure provides a multilayer board including at least one single-sided board or at least one double-sided board and the above-mentioned laminate. The laminate is attached to the at least one single-sided board or the at least one double-sided board. Specifically, the laminate and the at least one single-sided board or the at least one double-sided board are laminated together. Since the laminate of the present disclosure has good heat resistance, when thermally pressing several laminates of the present disclosure to form a multilayer board, the metal wires can be prevented from sinking into the liquid crystal polymer films. Therefore, problems such as circuit impedance errors, increased transmission losses, and increased cross-talk between wires caused by circuit deformation can be prevented. Accordingly, the multilayer board can have good quality after hot pressing.

FIG. 1 is a schematic cross-sectional view of a multilayer board according to various embodiments of the present disclosure. As shown in FIG. 1, a multilayer board ML1 includes a laminate 110 and a laminate 120. The laminate 110 and the laminate 120 respectively include a liquid crystal polymer film with a melting point greater than or equal to 345° C. and at least one metallic layer (not shown) attached to the surface of the liquid crystal polymer film. Since the liquid crystal polymer film has a high melting point, when the laminate 110 and the laminate 120 are laminated (thermally pressed) to each other to form the multilayer board ML1, the metallic layer does not sink into the liquid crystal polymer film and may not be deformed. Accordingly, the multilayer board ML1 can have good quality after lamination. In some embodiments, the laminate 110 and the laminate 120 are independently a single-sided board or a double-sided board.

Figure 2:
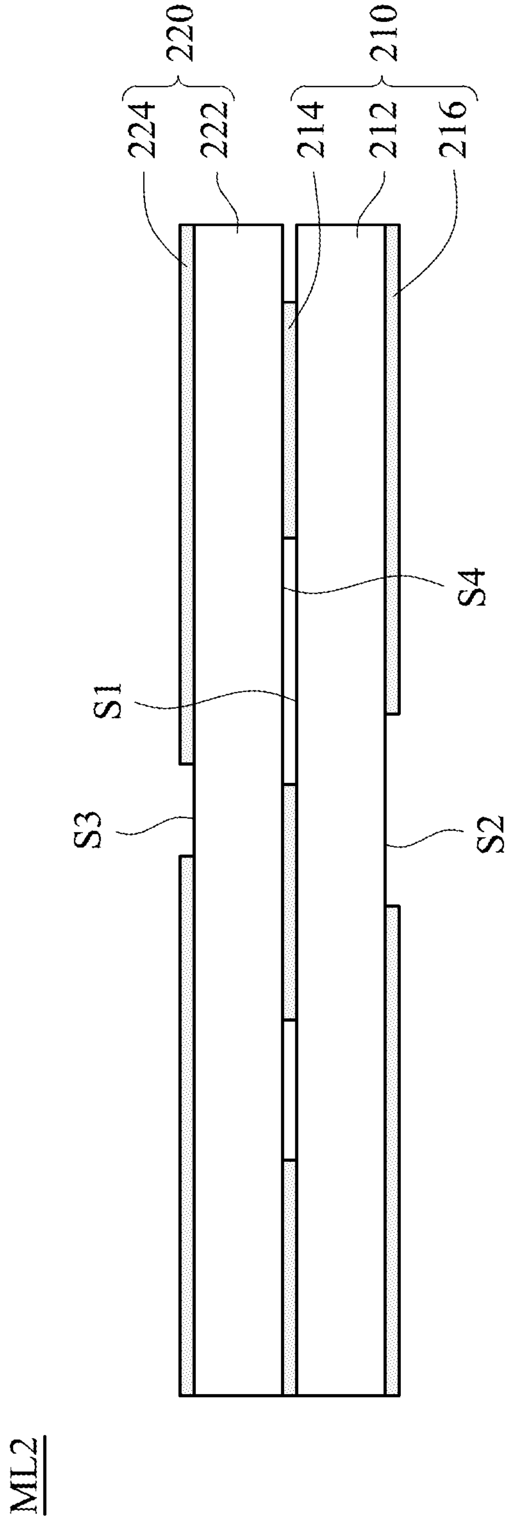

FIG. 2 is a schematic cross-sectional view of a multilayer board according to various embodiments of the present disclosure. A multilayer board ML2 includes a laminate 210 and a laminate 220. The laminate 210 is a double-sided board, and the laminate 220 is a single-sided board. The laminate 210 includes a liquid crystal polymer film 212, a metallic layer 214, and a metallic layer 216. The metallic layer 214 and the metallic layer 216 are respectively attached to the upper surface S1 and the lower surface S2 of the liquid crystal polymer film 212. In more detail, the metallic layer 214 directly contacts the upper surface S1, and the metallic layer 216 directly contacts the lower surface S2. The laminate 220 includes a liquid crystal polymer film 222 and a metallic layer 224. The metallic layer 224 is attached to the upper surface S3 of the liquid crystal polymer film 222. In more detail, the metallic layer 224 directly contacts the upper surface S3. Both the liquid crystal polymer films 212 and 222 have melting points greater than or equal to 345° C. As shown in FIG. 2, the metallic layers 214, 216, and 224 are metal wires, which can also be referred as patterned metallic layers. The metal wires are, for example, copper wires. The method of forming a metal wire includes: forming a metal foil (such as a copper foil) on the surface of the liquid crystal polymer film, and then etching the metal foil to form the metal wire. The method of forming the metal foil is, for example, sputtering, electroless plating, or electrolytic plating. In other embodiments, the metal wire is directly formed on the surface of the liquid crystal polymer film by printing or electroplating. However, in other embodiments, the metallic layers 214, 216, and 224 may be metal foils that are not etched, so the upper surfaces S1, S2, and S3 are completely covered by the metallic layers 214, 216, and 224, respectively. In some embodiments, the liquid crystal polymer films 212 and 222 are independently thermoplastic liquid crystal polymer films or thermotropic liquid crystal polymer films.

Please continue to refer to FIG. 2. The laminate 210 and the laminate 220 are stacked so that the metallic layer 214 contacts the lower surface S4 of the liquid crystal polymer film 222. Since the liquid crystal polymer film 212 has a high melting point, when the laminate 210 and the laminate 220 are laminated (thermally pressed) to form the multilayer board ML2, the metallic layer 214 does not sink into the liquid crystal polymer film 212, and the metallic layer 214 does not be deformed by the lamination. Therefore, the distance between the metallic layer 214 and the metallic layer 216 can comply with the predetermined circuit design. As stated above, the lamination (thermally pressing) may not cause impedance errors in the predetermined circuit design, may not increase signal transmission loss, and may not increase cross-talk between wires. The multilayer board ML2 can have good quality.

Figure 3:
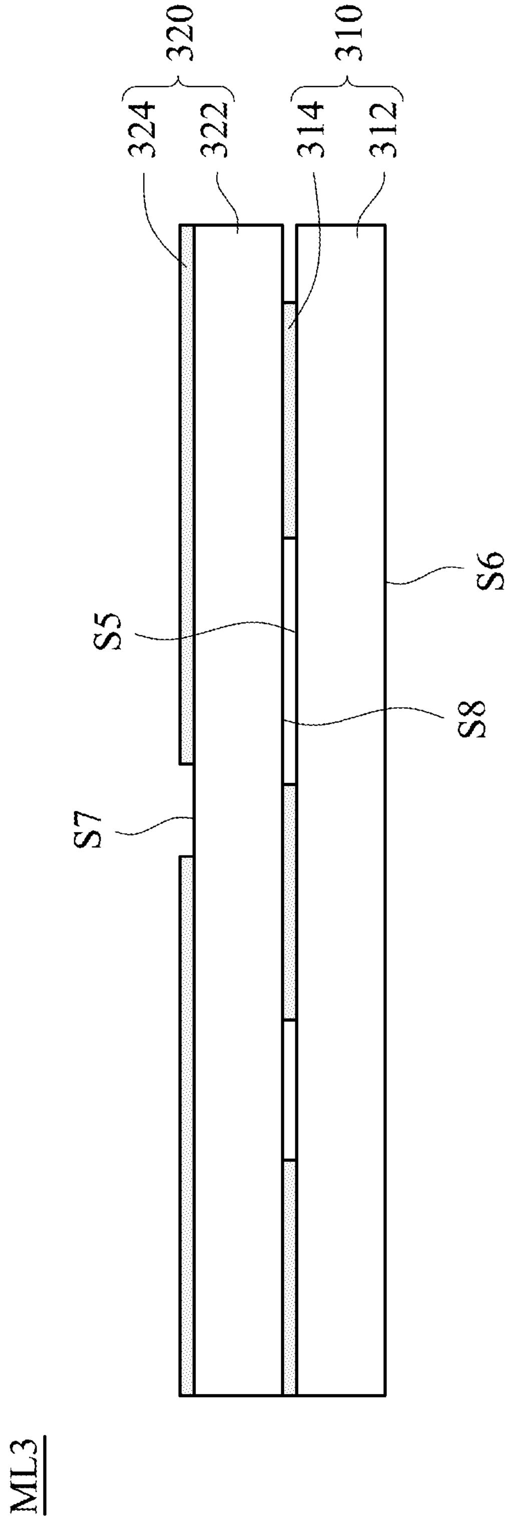

FIG. 3 is a schematic cross-sectional view of a multilayer board according to various embodiments of the present disclosure. A multilayer board ML3 includes a laminate 310 and a laminate 320. Both of the laminate 310 and the laminate 320 are single-sided boards. The laminate 310 includes a liquid crystal polymer film 312 and a metallic layer 314. The metallic layer 314 is attached to the upper surface S5 of the liquid crystal polymer film 312, and the lower surface S6 of the liquid crystal polymer film 312 is not covered by a metallic layer. In more detail, the metallic layer 314 directly contacts the upper surface S5. The laminate 320 includes a liquid crystal polymer film 322 and a metallic layer 324. The metallic layer 324 is attached to the upper surface S7 of the liquid crystal polymer film 322. In more detail, the metallic layer 324 directly contacts the upper surface S7. The liquid crystal polymer films 312 and 322 have melting points greater than or equal to 345° C. As shown in FIG. 3, the metallic layers 314 and 324 are metal wires, which can also be referred as patterned metallic layers. However, in other embodiments, the metallic layers 314 and 324 may be metal foils that are not etched, so the upper surfaces S5 and S7 are completely covered by the metallic layers 314 and 324 respectively.

Please continue to refer to FIG. 3. The laminate 310 and the laminate 320 are stacked so that the metallic layer 314 contacts the lower surface S8 of the liquid crystal polymer film 322. Since the liquid crystal polymer film 312 has a high melting point, when the laminate 310 and the laminate 320 are laminated (thermally pressed) to form the multilayer board ML3, the metallic layer 314 does not sink into the liquid crystal polymer film 312, and the metallic layer 314 may not be deformed by lamination. Therefore, the lamination (thermally pressing) may not cause impedance errors in the predetermined circuit design, may not increase signal transmission loss, and may not increase cross-talk between wires. The multilayer board ML3 can have good quality.

Figure 4:
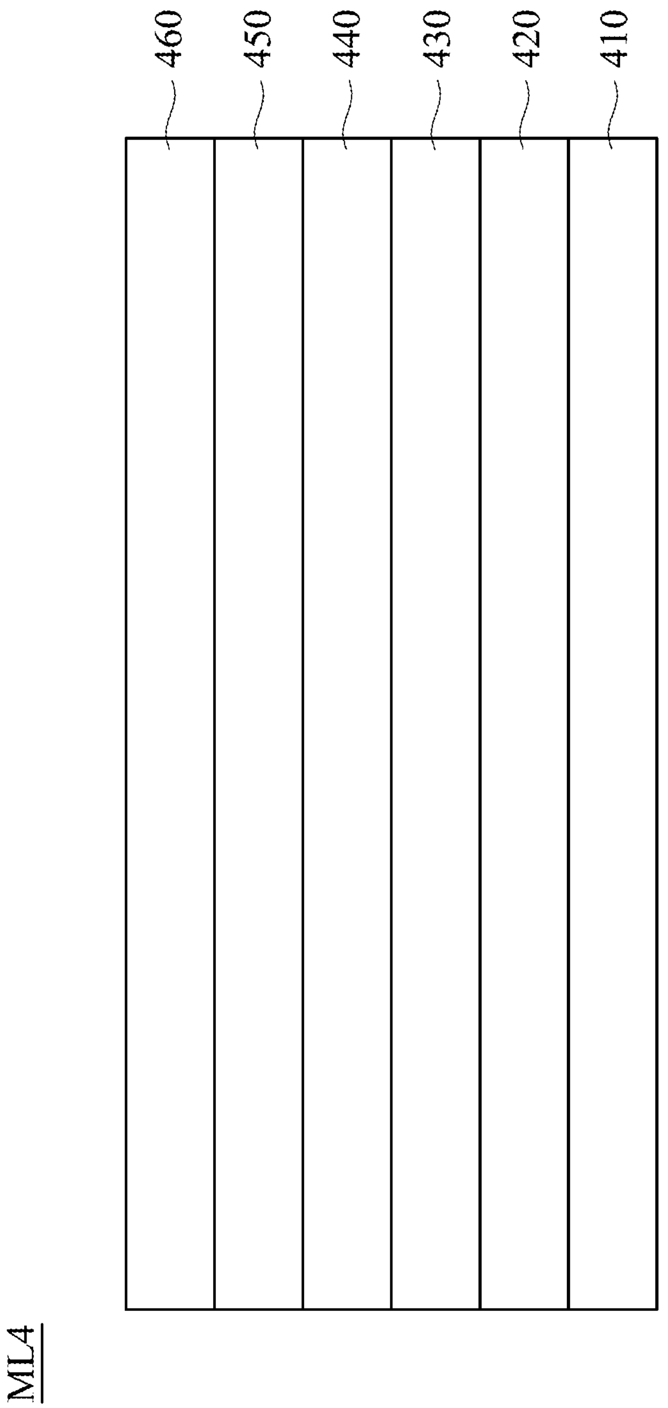

FIG. 4 is a schematic cross-sectional views of a multilayer board according to various embodiments of the present disclosure. A multilayer board ML4 includes the laminates 410, 420, 430, 440, 450, 460, and each of the above laminate contains a liquid crystal polymer film having a melting point greater than or equal to 345° C. Each laminate may be a single-sided board or a double-sided board. For the embodiments of the single-sided board, the above embodiments of the laminate 220, the laminate 310, or the laminate 320 may be referred. For the embodiments of the double-sided board, the above embodiments of the laminate 210 may be referred. The laminates 410, 420, 430, 440, 450, 460 are laminated to form the multilayer board ML4. In the multilayer board ML4, the number of the laminates can be adjusted arbitrarily according to design requirements. The number can be 3, 4, 5, 6, 7, 8, 9, 10, 11, 12, 13, 14, 15, 16, 17, 18, 19, 20, or 21, but not limited to this.

The present disclosure provides a method of manufacturing a laminate. The method includes the following operations. A liquid crystal polymer film is produced from a liquid crystal polymer having a melting point greater than or equal to 345° C. In some embodiments, the melting point is 345° C. to 400° C., such as 345, 350, 355, 360, 365, 370, 375, 385, 390, 395, or 400° C. The liquid crystal polymer is polymerized from reactants including a plurality of first monomers, a plurality of second monomers, a plurality of third monomers, a plurality of fourth monomers, or combinations thereof. The first monomers are aromatic dicarboxylic acids, aliphatic dicarboxylic acids, or combinations thereof, the second monomers are aromatic hydroxycarboxylic acids, the third monomers are aromatic diols, aliphatic diols, or combinations thereof, and the fourth monomers are aromatic diamines, aromatic hydroxylamines, aromatic aminocarboxylic acids, or combinations thereof. At least one metallic layer is formed to attach to a surface of the liquid crystal polymer film.

For example, the first monomers include

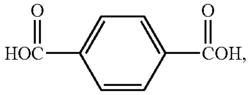
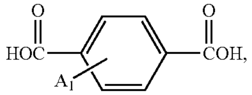
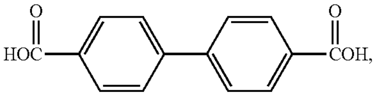
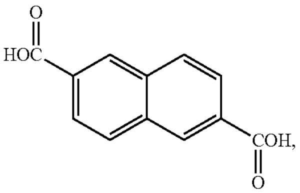
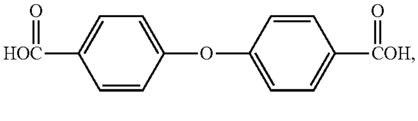

$HOOC(CH_2)_nCOOH$ (n is an integer from 2 to 12), or combinations thereof, but are not limited thereto. $A_1$ is a halogen group or an alkyl group. The halogen group is, for example, a fluoro group, a chloro group, a bromo group, or an iodo group. The alkyl group is, for example, a methyl, an ethyl, an n-propyl, or an isopropyl group. For example, the second monomers include

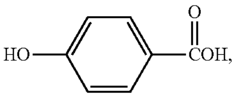
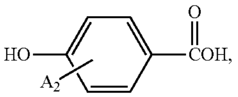
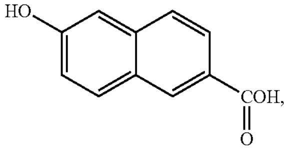
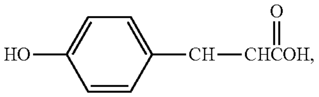

combinations thereof, but are not limited thereto. $A_2$ is a halogen group or an alkyl group. The halogen group is, for example, a fluoro group, a chloro group, a bromo group, or an iodo group. The alkyl group is, for example, a methyl, an ethyl, an n-propyl, or an isopropyl group. For example, the third monomers include

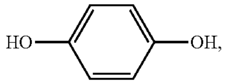
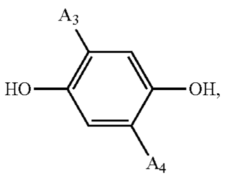
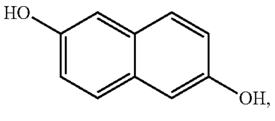

-continued

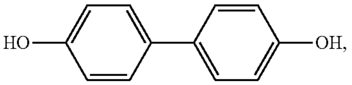
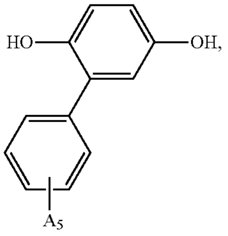

$HO(CH_2)_nOH$ (n is an integer from 2 to 12), or combinations thereof, but are not limited thereto. $A_3$ and $A_4$ are independently a halogen group or an alkyl group, and $A_5$ is H, a halogen group or an alkyl group. The halogen group is, for example, a fluoro group, a chloro group, a bromo group, or an iodo group. The alkyl group is, for example, a methyl, an ethyl, an n-propyl, or an isopropyl group. For example, the fourth monomers include

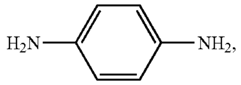
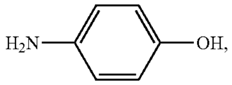
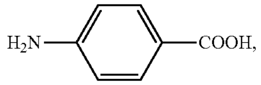

or combinations thereof, but are not limited thereto.

In some embodiments, the liquid crystal polymer having the melting point greater than or equal to 345° C. is polymerized from aromatic diols and aromatic dicarboxylic acids.

In some embodiments, the liquid crystal polymer having the melting point greater than or equal to 345° C. is polymerized from aromatic diols and aromatic hydroxycarboxylic acids.

In some embodiments, the liquid crystal polymer is a first type thermotropic liquid crystal polymer. In some embodiments, the first type thermotropic liquid crystal polymer includes a plurality of first monomer units, a plurality of second monomer units, and a plurality of third monomer units. Each first monomer unit is

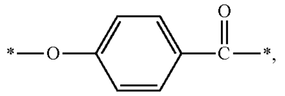

each second monomer unit is

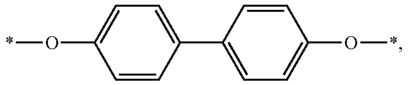

and each third monomer unit is

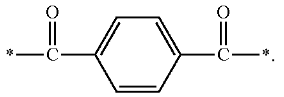

In some embodiments, the liquid crystal polymer having the melting point greater than or equal to 345° C. is polymerized from aromatic diols, aromatic dicarboxylic acids, and aromatic hydroxycarboxylic acids. For example, the liquid crystal polymer is polymerized from 4-hydroxybenzoic acid (HBA), 6-hydroxy-2-naphthalene carboxylic acid (HNA), terephthalic acid (TPA), and hydroquinone (HQ). The following first monomer unit, second monomer unit, third monomer unit, and fourth monomer unit can be obtained from HBA, HNA, TPA, and HQ, respectively. In some embodiments, the liquid crystal polymer includes a plurality of first monomer units, a plurality of second monomer units, a plurality of third monomer units, and a plurality of fourth monomer units. Each first monomer unit is

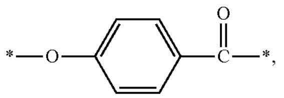

each second monomer unit is

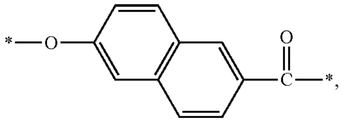

each third monomer unit is

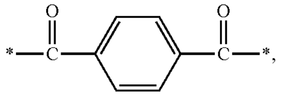

and each fourth monomer unit is

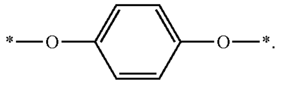

In some embodiments, in the liquid crystal polymer, the first monomer units are 60 mole % to 74 mole %, the second monomer units are 14 mole % to 16 mole %, the third monomer units are 5 mole % to 13 mole %, and the fourth monomer units are 5 mole % to 13 mole %. In some embodiments, in the liquid crystal polymer, the first monomer units are 60 mole % to 74 mole %, the second monomer units are 16 mole % to 18 mole %, the third monomer units are 9 mole % to 12 mole %, and the fourth monomer units are 9 mole % to 12 mole %. The molar percentages of the first monomer units, the second monomer units, the third monomer units, and the fourth monomer units may be any positive integer within the above numerical ranges.

Figure 6:
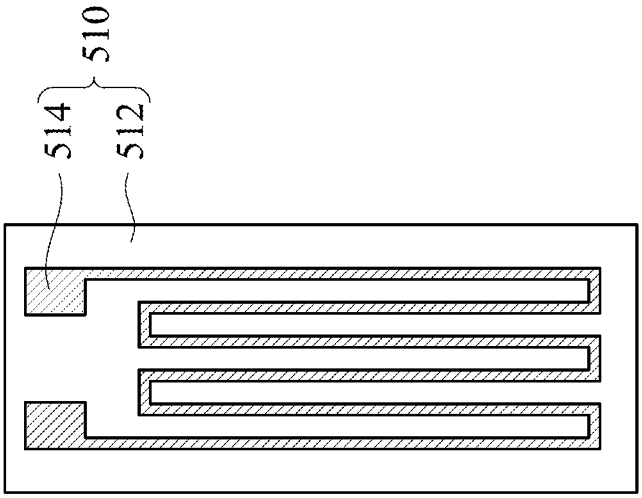
FIG. 6 is a schematic bottom view of a laminate according to various embodiments of the present disclosure.
Figure 5:
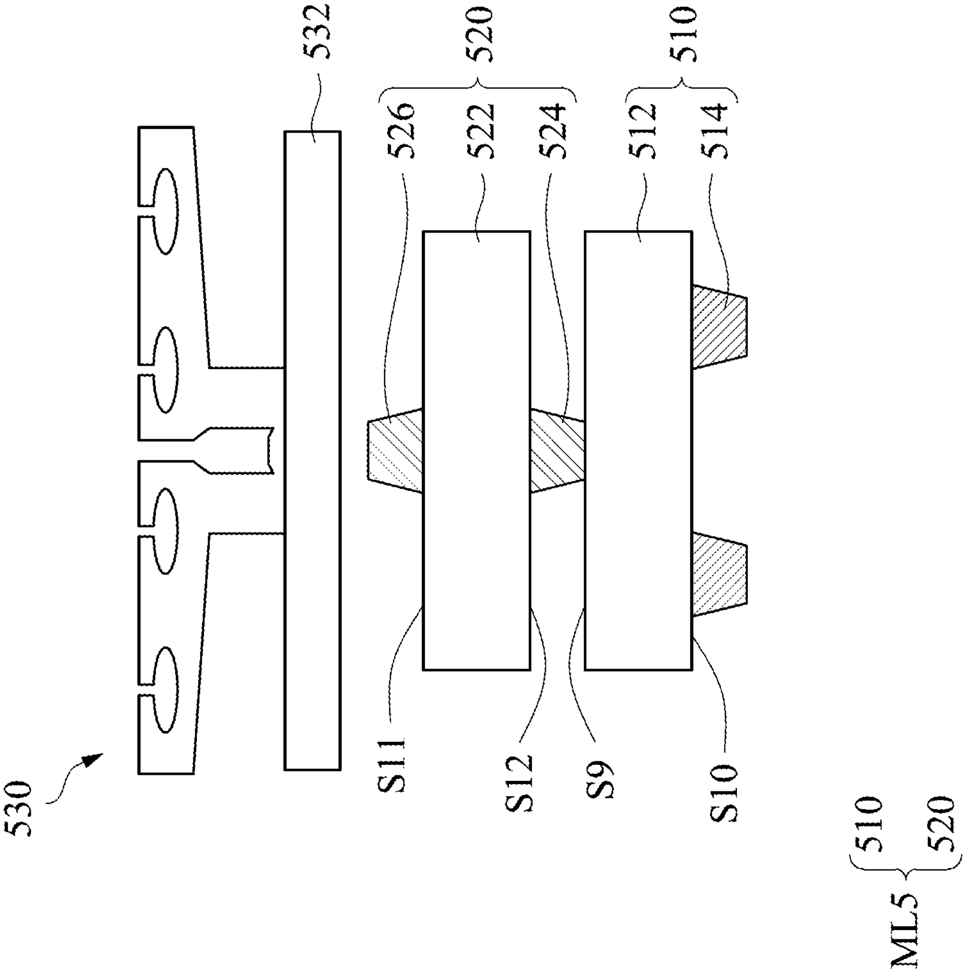
FIG. 5 is a schematic diagram of performing a thermal shock test according to various embodiments of the present disclosure.

Next, thermal shock tests were conducted on laminates including liquid crystal polymer films and copper wires. Please refer to FIG. 5. FIG. 5 is a schematic diagram of performing a thermal shock test according to various embodiments of the present disclosure. A laminate 510 includes a liquid crystal polymer film 512 and a metallic layer 514. The metallic layer 514 is attached to the lower surface S10 of the liquid crystal polymer film 512. The laminate 520 includes a liquid crystal polymer film 522, a metallic layer 524, and a metallic layer 526. The metallic layer 526 and the metallic layer 524 are respectively attached to the upper surface S11 and the lower surface S12 of the liquid crystal polymer film 522. The laminate 510 is a single-sided flexible printed circuit board, and the laminate 520 is a double-sided flexible printed circuit board. The laminate 510 and the laminate 520 were stacked so that the metallic layer 524 contacted the upper surface S9 of the liquid crystal polymer film 512. The laminate 510 and laminate 520 were hot-pressed by a cushion pad 532 of a thermode 530, in which the thickness of the cushion pad 532 was 25 μm. The materials of the liquid crystal polymer films 512 and 522 were the same, and each included a liquid crystal polymer polymerized from HBA, HNA, TPA, and HQ. Therefore, the liquid crystal polymer included the above-mentioned first monomer units, second monomer units, third monomer units, and fourth monomer units. The thicknesses of the liquid crystal polymer films 512 and 522 were 50 μm, and the metallic layers 514, 524, and 526 were copper wires. The thicknesses of the copper wires were 12 μm, the line width is 1 mm, and the line spacing was 1 mm. The hot-pressing temperature could be between 250° C. and 320° C., the hot-pressing pressure was 10 N, the hot-pressing time was 20 seconds, and the number of the hot-pressing was 10. Please refer to FIG. 6. FIG. 6 is a schematic bottom view of a laminate according to various embodiments of the present disclosure. FIG. 5 shows that the laminate 510 is a partial cross-sectional view of the laminate 510 in FIG. 6. The wire patterns of the metallic layers 524 and 526 can be designed with reference to the wire pattern of the metallic layer 514. Please refer to Table 1 below for the test results of thermal shock using different liquid crystal polymer films.

TABLE 1

| | First monomer units (mole %) | Second monomer units (mole %) | Third monomer units (mole %) | Fourth monomer units (mole %) | Melting point (° C.) | Hot-pressing temperature (° C.) | Sunken depth of wire (um) |
|---|---|---|---|---|---|---|---|
| Example 1 | 60 | 14 | 13 | 13 | 355 | 285 | 0 |
| Example 2 | 74 | 16 | 5 | 5 | 355 | 285 | 0 |
| Example 3 | 60 | 16 | 12 | 12 | 350 | 275 | 0 |
| Example 4 | 74 | 18 | 9 | 9 | 350 | 275 | 0 |

TABLE 1-continued

| | First monomer units (mole %) | Second monomer units (mole %) | Third monomer units (mole %) | Fourth monomer units (mole %) | Melting point (° C.) | Hot-pressing temperature (° C.) | Sunken depth of wire (um) |
|---|---|---|---|---|---|---|---|
| Comparative Example 1 | 72 | 18 | 5 | 5 | 320 | 285 | 12 |
| Comparative Example 2 | 74 | 20 | 4 | 4 | 310 | 275 | 12 |

It can be seen from Table 1 that the melting points of the liquid crystal polymer films of Example 1 to Example 4 are higher than 345° C. The liquid crystal polymer film having the melting point of 350° C. can withstand a hot-pressing temperature of 275° C. Specifically, the copper wires of the liquid crystal polymer laminate do not sink into the liquid crystal polymer film at 275° C. The liquid crystal polymer film having the melting point of 355° C. can withstand a hot-pressing temperature of 285° C. Specifically, the copper wires of the liquid crystal polymer laminate do not sink into the liquid crystal polymer film at 285° C. On the other hand, in Comparative Example 1 to Comparative Example 2, since the melting points of liquid crystal polymer films are lower than 345° C., the copper wires completely sink into the liquid crystal polymer films.

The present disclosure provides another method of manufacturing a laminate, and the method includes the following operations. A first liquid crystal polymer film is produced from a liquid crystal polymer having a melting point less than 345° C. The liquid crystal polymer is formed by polymerized by reactants including a plurality of first monomers, a plurality of second monomers, a plurality of third monomers, a plurality of fourth monomers, or combinations thereof. The first monomers are aromatic dicarboxylic acids, aliphatic dicarboxylic acids, or combinations thereof, the second monomers are aromatic hydroxycarboxylic acids, the third monomers are aromatic diols, aliphatic diols, or combinations thereof, and the fourth monomers are aromatic diamines, aromatic hydroxylamines, aromatic aminocarboxylic acids, or combinations thereof. Please refer to the foregoing embodiments for the embodiments of the first monomers, the second monomers, the third monomers, and the fourth monomers, and the embodiments will not be repeated. The proportion of monomers for synthesizing the liquid crystal polymer can be adjusted so that the melting point of the liquid crystal polymer is less than, equal to, or greater than 345° C. A first melting point of the first liquid crystal polymer film is $T_m$, and $T_m$ is less than 345° C. The first liquid crystal polymer film is heated with a heating process to form a second liquid crystal polymer film, and the second liquid crystal polymer film has a second melting point greater than or equal to 345° C. The heating temperature of the heating process is $T_m$−40° C. to $T_m$. At least one metallic layer is formed to attach to a surface of the second liquid crystal polymer film. The laminate in any of the aforementioned embodiments can be manufactured by the method, and the laminate can be a single-sided board or a double-sided board.

In some embodiments, the heating temperature is, for example, $T_m$−40, $T_m$−35, $T_m$−30, $T_m$−25, $T_m$−20, $T_m$−15, $T_m$−10, $T_m$−5, or $T_m$° C. When heated, the polymers within the liquid crystal polymer film may rearrange to increase the polymer molecular weight and arrange more orderly, thereby increasing the melting point of the liquid crystal polymer film. Increasing the melting point can make the liquid crystal polymer film have better heat resistance. When laminating several liquid crystal polymer laminates to form a multilayer board, the quality of the lamination can be better, and the metal wires may not easily sink into the liquid crystal polymer films. In some embodiments, the heating rate of the heating process is 0.1° C./minute to 30° C./minute. The heating rate is, for example, 0.1, 0.5, 1, 5, 10, 15, 20, 25, or 30° C./min. In some embodiments, the heating time of the heating process ranges from 10 minutes to 900 minutes. The heating time is, for example, 10, 20, 40, 60, 80, 100, 200, 300, 400, 500, 600, 700, 800, or 900 minutes. In some embodiments, the heating process is performed in an inert environment. For example, the inert gas in the inert environment is argon, nitrogen, or a combination thereof.

In some embodiments, the liquid crystal polymer having the melting point less than 345° C. is polymerized from aromatic diols, aromatic dicarboxylic acids, and aromatic hydroxycarboxylic acids. In some embodiments, the liquid crystal polymer having the melting point less than 345° C. is polymerized from aromatic diols and aromatic dicarboxylic acids. In some embodiments, the liquid crystal polymer having the melting point less than 345° C. is polymerized from aromatic diols and aromatic hydroxycarboxylic acids.

In some embodiments, the reactants include first aromatic hydroxycarboxylic acids and second aromatic hydroxycarboxylic acids that are different. In some embodiments, the liquid crystal polymer film includes a second type thermotropic liquid crystal polymer. In some embodiments, the second type thermotropic liquid crystal polymer is polymerized from 4-hydroxybenzoic acid (HBA) and 6-hydroxy-2-naphthalene carboxylic acid (HNA). The following first monomer units and second monomer units can be obtained from HBA and HNA, respectively. In some embodiments, the liquid crystal polymer includes a plurality of first monomer units and a plurality of second monomer units. Each first monomer unit is

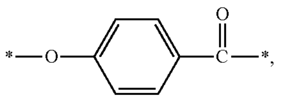

and each second monomer unit is

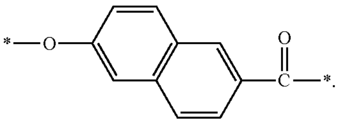

The first monomer units are 70 mole % to 85 mole %, and the second monomer units are 15 mole % to 30 mole %. The molar percentages of the first monomer units and the second monomer units may be any positive integer within the above numerical ranges.

In some embodiments, the liquid crystal polymer having the melting point less than 345° C. is polymerized from aromatic dicarboxylic acids, aromatic hydroxycarboxylic acids, and aromatic hydroxylamines. In some embodiments, the liquid crystal polymer is polymerized from 6-hydroxy-2-naphthalene carboxylic acid (HNA), terephthalic acid (TPA), and p-aminophenol (AP). The following second monomer units, third monomer units, and fourth monomer units in the liquid crystal polymer can be obtained from HNA, TPA, and AP, respectively. In some embodiments, the liquid crystal polymer includes a plurality of second monomer units, a plurality of third monomer units, and a plurality of fourth monomer units. Each second monomer unit is

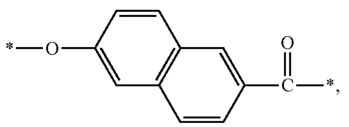

each third monomer unit is

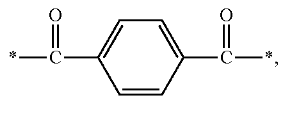

and each fourth monomer unit is

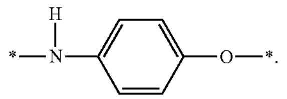

The second monomer units are 55 mole % to 65 mole %, the third monomer units are 15 mole % to 25 mole %, and the fourth monomer units are 15 mole % to 25 mole %. The molar percentages of the second monomer units, the third monomer units, and the fourth monomer units may be any positive integer within the above numerical ranges.

In some embodiments, the liquid crystal polymer having the melting point less than 345° C. is polymerized from aromatic diols, aromatic dicarboxylic acids, and aromatic hydroxycarboxylic acids. In some embodiments, the liquid crystal polymer is polymerized from 4-hydroxybenzoic acid (HBA), 6-hydroxy-2-naphthalene carboxylic acid (HNA), terephthalic acid (TPA), and 4,4'-biphenol (BP). The following first monomer units, the second monomer units, the third monomer units, and the fifth monomer units in the liquid crystal polymer can be obtained from HBA, HNA, TPA, and BP, respectively. In some embodiments, the liquid crystal polymer includes a plurality of first monomer units, a plurality of second monomer units, a plurality of third monomer units, and a plurality of fifth monomer units. Each first monomer unit is

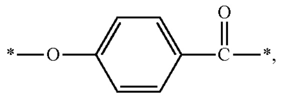

each second monomer unit is

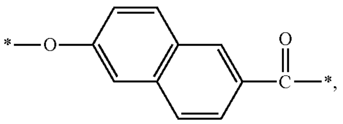

each third monomer unit is

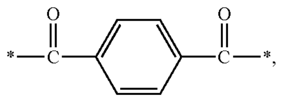

and each fifth monomer unit is

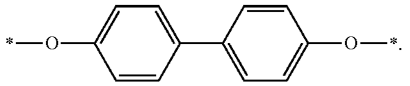

For the melting points of the liquid crystal polymer film 1-4 and the molar percentages of the monomer units, please refer to Table 2 below.

TABLE 2

| Liquid crystal polymer film | First monomer units (mole %) | Second monomer units (mole %) | Third monomer units (mole %) | Fourth monomer units (mole %) | Fifth monomer units (mole %) | Melting point (° C.) |
|---|---|---|---|---|---|---|
| 1 | 73 | 27 | 0 | 0 | 0 | 280 |
| 2 | 80 | 20 | 0 | 0 | 0 | 325 |
| 3 | 0 | 60 | 20 | 20 | 0 | 280 |
| 4 | 60 | 4 | 18 | 0 | 18 | 335 |

In some embodiments, the liquid crystal polymer is polymerized from aromatic dicarboxylic acids, aromatic hydroxycarboxylic acids, and aliphatic diols. In some embodiments, the liquid crystal polymer includes the following monomer units:

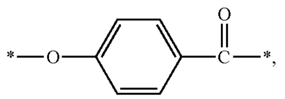

-continued

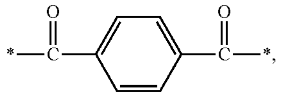, and $*—OCH_2CH_2O—*$.

Next, a thermal shock test was performed under the configuration shown in FIG. 5, and the test results are shown in Table 3 below. During the test, the liquid crystal polymer films of Comparative Example 3 and Example 5 to Example 7 were selected from the liquid crystal polymer film 1 or the liquid crystal polymer film 3 in the aforementioned Table 2. The melting points of the liquid crystal polymer films were adjusted through heating processes to obtain the melting points after heating in Table 3. Copper wires were formed on the liquid crystal polymer films, and then thermal shock tests were performed. The liquid crystal polymer films in Comparative Example 4 and Example 8 to Example 9 were selected from the liquid crystal polymer film 2 in aforementioned Table 2. The melting points of the liquid crystal polymer films were adjusted through heating processes to obtain the melting points after heating in Table 3. Copper wires were formed on the liquid crystal polymer films, and then thermal shock tests were performed.

TABLE 3

| | Melting point of liquid crystal polymer film (° C.) | Melting point after heating (° C.) | Hot pressing temperature (° C.) | Sunken depth of wire (um) |
|---|---|---|---|---|
| Comparative Example 3 | 280 | 320 | 260 | 12 |
| Example 5 | 280 | 345 | 260 | 0 |
| Example 6 | 280 | 350 | 275 | 0 |
| Example 7 | 280 | 355 | 285 | 0 |
| Comparative Example 4 | 325 | 335 | 260 | 12 |
| Example 8 | 325 | 350 | 275 | 0 |
| Example 9 | 325 | 355 | 285 | 0 |

It can be seen from Table 3 that liquid crystal polymer films with the melting points of 345° C., 350° C., and 355° C. after heating can withstand hot pressing temperatures of 260° C., 275° C., and 285° C., respectively. More specifically, the copper wires of the liquid crystal polymer laminates do not sink into the liquid crystal polymer films at the above hot pressing temperatures. In contrast, in Comparative Example 3 and Comparative Example 4, since the melting points of liquid crystal polymer films are lower than 345° C., the copper wires completely sink into the liquid crystal polymer films.

In summary, the present disclosure provides a laminate, a manufacturing method thereof, and a multilayer board. The laminate includes a liquid crystal polymer film and at least one metallic layer attached to the surface of liquid crystal polymer film. Since the laminate of the present disclosure has good heat resistance, when thermally pressing several laminates to form a multilayer board, it can prevent metal wires from sinking into the liquid crystal polymer films. Therefore, problems such as circuit impedance errors, increased transmission losses, and increased cross-talk between wires caused by circuit deformation can be prevented. Therefore, the multilayer board can have good quality after hot pressing.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the present disclosure. In view of the foregoing, it is intended that the present disclosure cover modifications and variations of this disclosure provided they fall within the scope of the following claims.

What is claimed is:

1. A laminate, comprising:

a liquid crystal polymer film having a melting point greater than or equal to 345° C., wherein the liquid crystal polymer film comprises a liquid crystal polymer polymerized from reactants comprising a plurality of first monomers and a plurality of second monomers and comprising a plurality of third monomers, a plurality of fourth monomers, or combinations thereof, the first monomers are aromatic dicarboxylic acids that are

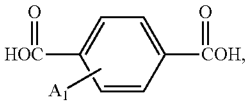

$A_1$ is a halogen group or an alkyl group, the second monomers comprise

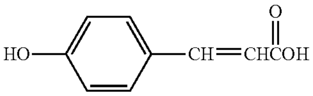

the third monomers are aromatic diols, aliphatic diols, or combinations thereof, and the fourth monomers are aromatic diamines, aromatic hydroxylamines, aromatic aminocarboxylic acids, or combinations thereof; and at least one metallic layer attached to a surface of the liquid crystal polymer film.

2. The laminate of claim 1, wherein the liquid crystal polymer is polymerized from the aromatic diols, the aromatic dicarboxylic acids, and

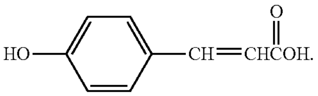

3. The laminate of claim 1, wherein the liquid crystal polymer is polymerized from the aromatic dicarboxylic acids,

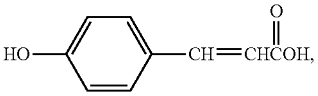

and the aromatic hydroxylamines.

4. The laminate of claim 1, wherein the liquid crystal polymer is polymerized from the aromatic dicarboxylic acids,

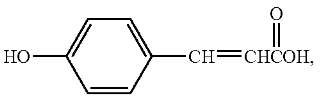

and the aliphatic diols.

5. The laminate of claim 1, wherein the liquid crystal polymer comprises the third monomers, and the third monomers comprise

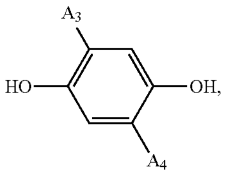, 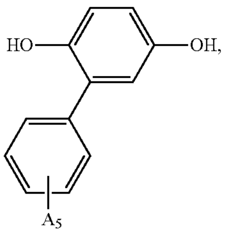

or a combination thereof, $A_3$ and $A_4$ are independently a halogen group or an alkyl group, and $A_5$ is H, a halogen group or an alkyl group.

6. A multilayer board, comprising at least one single-sided board or at least one double-sided board; and the laminate of claim 1 laminated on the at least one single-sided board or the at least one double-sided board.

7. A method of manufacturing a laminate, comprising:

producing a liquid crystal polymer film from a liquid crystal polymer having a melting point greater than or equal to 345° C., wherein the liquid crystal polymer is polymerized from reactants comprising a plurality of first monomers and a plurality of second monomers and comprising a plurality of third monomers, a plurality of fourth monomers, or combinations thereof, the first monomers are aromatic dicarboxylic acids that are

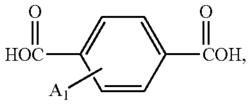

$A_1$ is a halogen group or an alkyl group, the second monomers comprise

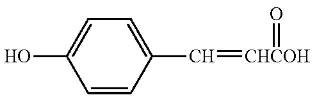

the third monomers are aromatic diols, aliphatic diols, or combinations thereof, and the fourth monomers are aromatic diamines, aromatic hydroxylamines, aromatic aminocarboxylic acids, or combinations thereof; and forming at least one metallic layer to attach to a surface of the liquid crystal polymer film.

8. The method of claim 7, wherein the liquid crystal polymer is polymerized from the aromatic diols, the aromatic dicarboxylic acids, and

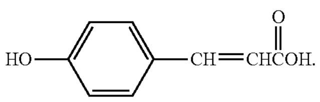

9. The method of claim 7, wherein the liquid crystal polymer comprises the third monomers, and the third monomers comprise

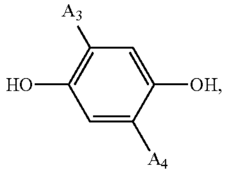, 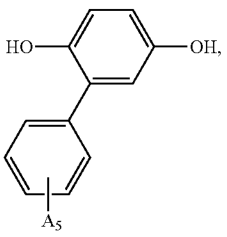

or a combination thereof, $A_3$ and $A_4$ are independently a halogen group or an alkyl group, and $A_5$ is H, a halogen group or an alkyl group.

10. A method of manufacturing a laminate, comprising:

producing a first liquid crystal polymer film from a liquid crystal polymer having a melting point less than 345° C., wherein the liquid crystal polymer is polymerized from reactants comprising a plurality of second monomers and comprising a plurality of first monomers, a plurality of third monomers, a plurality of fourth monomers, or combinations thereof, the first monomers are aromatic dicarboxylic acids, aliphatic dicarboxylic acids, or combinations thereof, the second monomers comprise

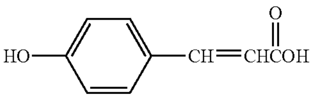

the third monomers are aromatic diols, aliphatic diols, or combinations thereof, the fourth monomers are aromatic diamines, aromatic hydroxylamines, aromatic aminocarboxylic acids, or combinations thereof, a first melting point of the first liquid crystal polymer film is $T_m$, and $T_m$ is less than 345° C.;

heating the first liquid crystal polymer film with a heating process to form a second liquid crystal polymer film, the second liquid crystal polymer film having a second melting point greater than or equal to 345° C., wherein a heating temperature of the heating process is $T_m$−40° C. to $T_m$, and a heating rate of the heating process is 0.1° C./minute to 30° C./minute; and forming at least one metallic layer to attach to a surface of the second liquid crystal polymer film.

11. The method of claim 10, wherein the liquid crystal polymer is polymerized from the aromatic dicarboxylic acids,

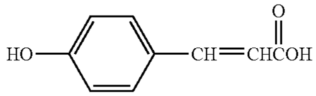
and the aromatic hydroxylamines.
12. The method of claim 10, wherein the liquid crystal polymer is polymerized from the aromatic dicarboxylic acids,
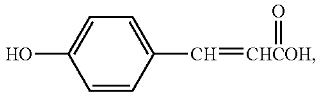
and the aliphatic diols.
13. The method of claim 10, wherein the heating temperature of the heating process is $T_m$–15° C. to $T_m$.
14. The method of claim 10, wherein the heating temperature of the heating process is $T_m$–10° C. to $T_m$.
* * * * *